C. BORNMANN.
PHOTOGRAPHIC CAMERA.
APPLICATION FILED JAN. 12, 1912.
1,033,523.
Patented July 23, 1912.
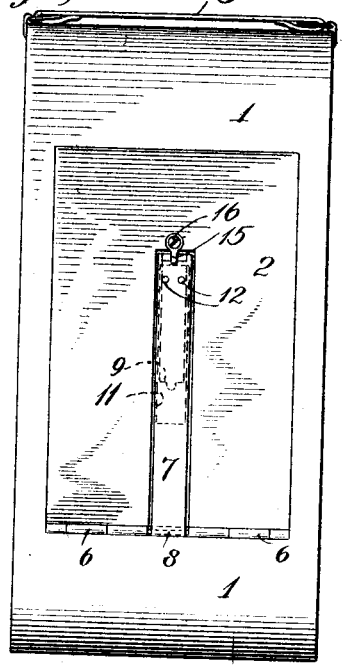
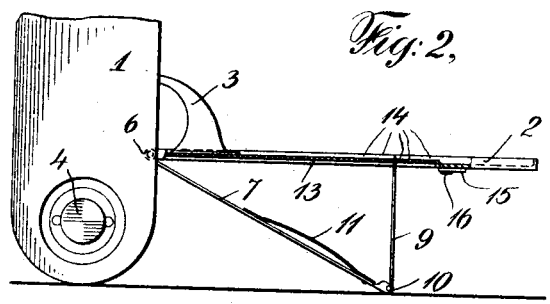
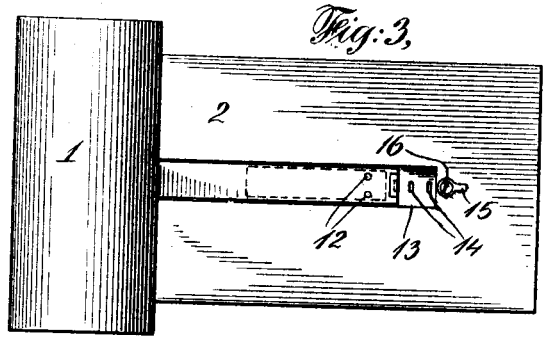
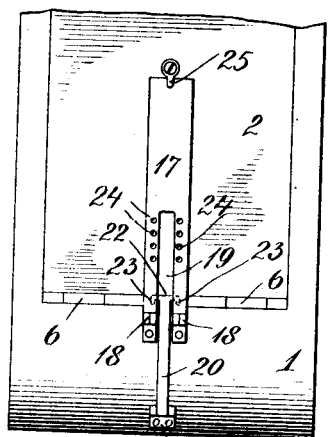
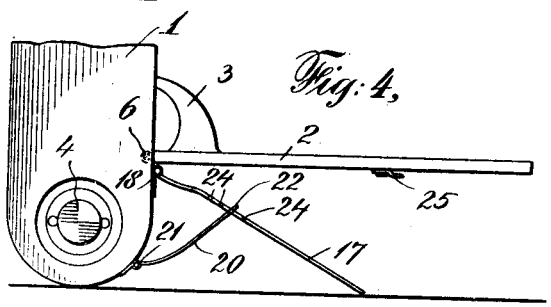
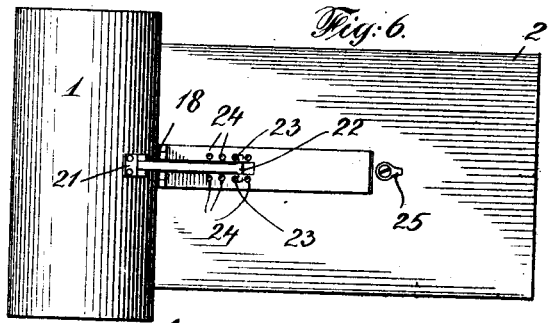
Witnesses:
Max B. A. Doring
F. M. Onsbach
Carl Bornmann, Inventor.
By his Attorney
Phillips Abbott.

UNITED STATES PATENT OFFICE.

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,033,523.   Specification of Letters Patent.   Patented July 23, 1912.

Application filed January 12, 1912. Serial No. 670,912.

*To all whom it may concern:*

Be it known that I, CARL BORNMANN, a citizen of the United States, and a resident of the city of Binghamton, county of Broome, State of New York, have invented certain new and useful Improvements in Photographic Cameras, of which the following is a full, clear, and exact description.

It is the purpose of this invention to provide a support for cameras, particularly those of the so-called folding or collapsing variety, adapted to sustain the same without the use of a tripod during the making of time exposures. Various devices for this purpose are now upon the market, but, so far as I know, they have all been attached to and supported by the folding front board of the camera, and it has been found that since the front board after considerable use becomes somewhat loose in its connection with the camera body, owing to wear or lost motion in the braces and hinges which connect the front board to the camera body, that slight motion or trembling of the camera during time exposures is liable to occur, owing to air drafts or to shocks or jars which agitate the table or other structure upon which the camera rests, thus occasioning defective exposures.

It is the purpose, therefore, of this present invention to so construct and arrange the supporting devices as to do away with the above stated objections and in addition to provide means whereby the camera may be tilted forwardly or backwardly, as may be necessary to more perfectly secure the desired exposure.

In the drawings, Figure 1 illustrates an elevation of the front of a folding camera, the front board and the support being both folded; Fig. 2 illustrates a side elevation, the front board being lowered, and the support in position for use; Fig. 3 illustrates an elevation of that which is shown in Fig 2 taken from beneath; Fig. 4 illustrates a side elevation of a camera embodying a modified construction, the front board being lowered; Fig. 5 illustrates a front elevation of that which is shown in Fig. 4, the parts being closed; Fig. 6 illustrates an elevation of that which is shown in Fig. 4 taken from beneath.

Referring first to Figs. 1, 2 and 3, 1 represents the camera body, 2 the folding front board, 3 the braces for the front board, 4 one of the fixed journals for one of the spools. 5 the strap or similar handle by which the camera may be carried, and 6 the hinges by which the front board is supported to the camera body. These parts are or may be of any preferred construction. 7 is a strip or bar of relatively stiff material, preferably metal, which is hinged at 8 to the body of the camera. 9 is a brace bar, hinged at 10 to the strip 7. 11 is a flat spring, one end of which is riveted, as at 12, to the strip 7. 13 is a metallic plate set in a recess in the under side of the folding front board, which has a series of holes 14, 14, made in it. 15 is a latch pivoted at 16 to the folding front board.

The operation of the devices thus far described is as follows: When not in use, the brace bar 9 is folded down upon top of the spring 11 and then the strip carrying the spring 11 and the brace bar 9 with it, is folded up against the front board. In so doing, these parts enter the recess made therein for them, so that the outer surface of the strip 7 is substantially flush with the surface of the front board and they are held in this position by turning the latch 15 from the position shown in Figs. 2 and 3, to that shown in Fig. 1, so that the end of the latch will overlap the end of the strip 7 and hold it in place. When it is desired to make a time exposure, the latch is released, the parts 7, 9 and 11 are folded outwardly, as shown in Fig. 2, and the upper end of the brace bar 9 entered into one or the other of the series of holes 14 made in the metallic strip 13. This series of holes is provided, so that if there should be any looseness of the joints connecting the folding front board with the camera body, the brace bar 9 may be entered into such one of these holes as will compensate for the resulting lost motion and the dimensions of the parts are such as to provide for this result. It will be readily seen also that by locating the end of the brace bar 9 in the appropriate holes 14, the camera body may be intentionally tilted forwardly or rearwardly, because the parts are, or may be so made that when the brace bar 9 is vertical or nearly so, the camera will be tilted rearwardly and when the brace bar is inclined the camera will tilt over forwardly until arrested by the bar.

Referring now to Figs. 4, 5 and 6, a construction similar to that shown in the other figures is illustrated in them. When in use, however, this support has no connection whatever with the front board. In this construction 17 is the support proper. It is a strip or bar of relatively stiff metal hinged at 18 to the body of the camera and is provided with a slot 19 in which works a brace bar 20 pivoted at 21 to the body of the camera, and having a two pointed cross piece 22 on its end, the points being shown at 23, 23. They are adapted to enter holes 24 made in the support 17 and to be adjusted in such of these holes as is necessary to secure the desired result. 25 is a latch similar to the latch 15 above described, which fastens the parts in position when not in use. The other parts of the structure shown in Figs. 4, 5 and 6 are numbered the same as the similar parts in Figs. 1, 2 and 3.

The operation of the parts shown in Figs. 4, 5 and 6 is substantially the same as that of the parts shown in the other figures, that is to say, the latch 25 being released, the support bar 17 is swung downwardly into the position shown in Fig. 4 and the points or pins on the ends of the cross piece 22 of the brace bar 20 are entered into such of the holes 24 in the support bar 17 as will give the desired position to the camera. In the position shown in Fig. 4, the exposure will be made on the focal center. If the brace bar 20 is engaged with the holes nearer the free end of the support bar 17, then the camera will be tilted rearwardly; if, on the other hand, it is entered into holes 24 which are nearer the hinge 18, the camera will be tilted forwardly. When the parts 17, 20, are folded back against the front board, the cross piece on the end of the brace bar 20 will slide through the slot 19 made in the support 17 and be securely held in position, as shown in Fig. 5.

It will be noted that inasmuch as the strip 7 of Figs. 1, 2 and 3 and the support 17 of Figs. 4, 5 and 6 are hinged directly to the body of the camera and not to the front board and since the brace bar 9 in Figs. 1, 2, and 3, is adapted to adjustable engagement with the folding front board, and the brace bar 20 in Figs. 4, 5, and 6, is hinged directly to the camera body and is likewise adapted to adjustable engagement with the bar 17, that I not only secure unusual stability in the support of the camera but also the additional advantage that the camera may be tilted forwardly or rearwardly, as the operator may desire, and particularly since the supporting devices are each braced by a co-acting part, i. e., the bar 9 and the bar 20, that the supporting structure is strong and reliable.

It will be obvious to those who are familiar with such matters that modifications may be made in the details of construction without departing from the essentials of the invention. I therefore do not limit myself to the details as illustrated and described.

I claim:

1. In a folding camera, a folding front board, a support for the camera, embodying two members, one hinged directly to the camera body and the other connected to the first and adapted to act as a brace therefor, and means on the folding front board to hold the members composing the support in position when the camera is folded.

2. In a folding camera, a folding front board, a support for the camera embodying two members, one hinged directly to the camera body and the other movably connected to the first and adapted to act as a brace therefor and as an adjuster for the position of the camera, and means on the folding front board to hold the support members in position when the camera is folded.

3. A support for a folding camera composed of two parts which are connected together for the support of the camera and which are adapted to be folded relative to each other when the camera is not in use and when projected to adjustably support the camera.

4. A folding camera having a folding front board adapted to be projected and held at right angles to the body of the camera and a support for the camera embodying two members, one hinged directly to the camera body and the other movably and foldably connected to the first and adapted to act as a brace therefor and to support the camera.

5. A folding camera having a folding front board adapted to be projected and held at right angles to the body of the camera and a support for the camera embodying two members movably connected together and adapted when in use each to brace the other and to adjustably support the camera.

In testimony whereof I have signed my name to this specification in the presence of two subscribing witnesses.

CARL BORNMANN.

Witnesses:
 Geo. W. Topliff,
 A. Deichelmann.